May 26, 1959     M. D. BARNES ET AL     2,887,945
CAKING BOMB ASSEMBLY

Original Filed Aug. 8, 1951     2 Sheets-Sheet 1

Marion D. Barnes
James P. Lea
*INVENTOR.*

BY
*ATTORNEY*

Marion D. Barnes
James P. Lea
INVENTOR.

ATTORNEY

United States Patent Office 2,887,945
Patented May 26, 1959

2,887,945

CAKING BOMB ASSEMBLY

Marion D. Barnes and James P. Lea, El Dorado, Ark., assignors, by mesne assignments, to Monsanto Chemical Company, St. Louis, Mo., a corporation of Delaware Original application August 8, 1951, Serial No. 240,942, now Patent No. 2,762,294, dated September 11, 1956. Divided and this application November 14, 1955, Serial No. 547,255

1 Claim. (Cl. 100—99)

This invention relates to a caking bomb assembly, and more particularly to an apparatus for simultaneously preparing a plurality of specimens in the form of compressed cakes.

Considerable effort has been made in the fertilizer industry to minimize the tendency of fertilizers to cake. While much progress has been made along this line, the caking problem still exists. For instance, ammonium nitrate is manufactured in the form of pellets and the pellets coated in order to reduce caking. In view of the foregoing, as a control measure, it is necessary to provide means for preparing a large number of specimens for making caking tests. Accordingly, the present invention relates to an apparatus for preparing such specimens.

Although not limited to such application, the invention will be described with reference to apparatus particularly adapted for simulating the conditions to which bagged fertilizer is subjected during storage in order to determine the caking properties thereof. For this purpose, fertilizer is pressed into cakes under controlled conditions as to pressure, temperature, and humidity during a period of about one week. Tendency to cake then is measured as the pressure required to crush the cakes, as in a Carver laboratory press.

This invention will be understood more readily from the following description of apparatus forming various embodiments thereof.

Referring to the drawings generally:

Figure 1:
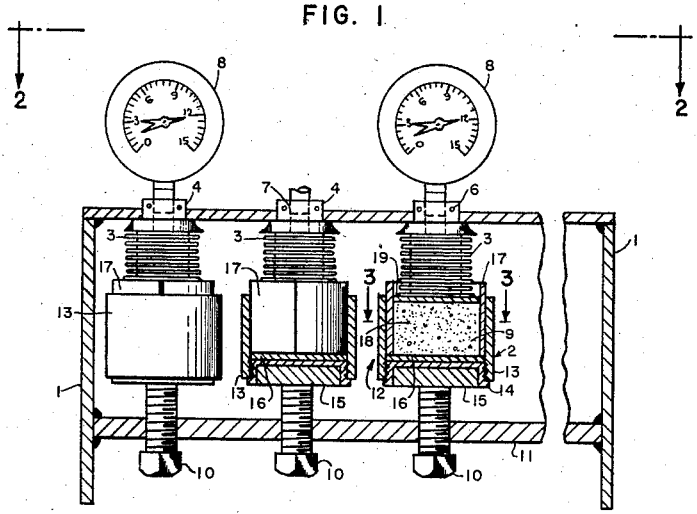
Figure 1 is a side elevation, partly in section, of a caking bomb and assembly rack.
Figure 2:
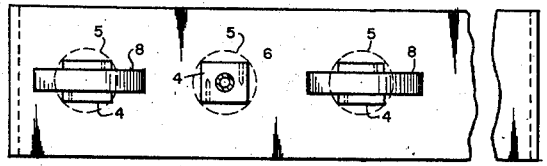
Figure 2 is a plan view on line 2—2 of Figure 1.
Figure 3:
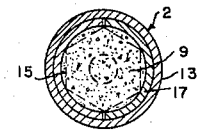
Figure 3 is a section view on line 3—3 of Figure 1 showing details of the cup in which the cakes are formed.

Referring to the drawings in greater detail:

Numeral 1 represents a rack or frame adapted to accommodate any desired number of bombs 2. Each bomb unit comprises metallic double wall bellows 3 to which is securely attached a head 4 held in the opening 5 of the rack with cotter pins 6 and communicating with the bellows through a tapped opening 7 into which a pressure gauge 8 is threaded. The bellows is filled with a fluid such as an organic fluid (e.g. mineral oil, dibutyl phthalate), water, or air in order to transmit the pressure to the gauge which is applied to the cake 9 by tightening the jack screw 10 threaded into the base plate 11 of the rack.

The cake-forming cup 12 of the bomb comprises an outer pipe 13 into the bottom of which is threaded an ordinary barrel bung 14 having a rod 15 attached in the well thereof more or less as a filler. Resting unattached on top of the bung is a metal plate 16 of substantially the same diameter as the inside diameter of the outer pipe 13. A pipe 17 split in half longitudinal fits inside the outer pipe 13 and rests on the plate 16. The material, e.g. ammonium nitrate pellets 18, to be pressed is placed in the cup 12 thus formed and a metal plate 19 is laid on top of the material. As indicated above, the desired pressure is applied to the ammonium nitrate by tightening the jack screws 10.

The entire assembly of bombs and the rack are placed in a cabinet (not shown) and the ammonium nitrate is subjected to controlled conditions as to pressure, temperature and humidity for about one week. Then the ammonium nitrate cakes formed are removed from the bomb by loosening the jack screw 10, removing the cake-forming cup 12 from between the jack screw and bellows, and removing each half of the split pipe 17. Tendency of the ammonium nitrate to cake is then determined by measuring the pressure required to crush the cakes, e.g. in a Carver laboratory press.

Figure 4:
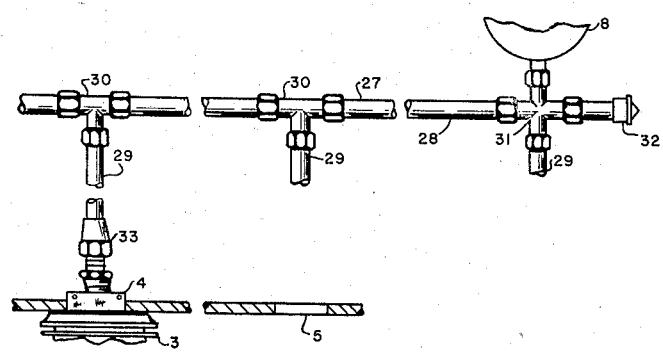
Figure 4 is a side elevation showing the modification of this invention in which pressure is applied by means of a fluid system.

The above described bomb works well but in order to increase the capacity of a given size rack and at the same time reduce the cost of the bomb and to make other improvements, the following described apparatus (Figures 4 and 5), comprising this invention, was devised.

Instead of the jack screws 10, a fluid system 27 can be used to apply pressure in forming the cakes. Any suitable fluid, such as oil, water or air, is applicable. The fluid system shown comprises a main fluid supply line 28, branch lines 29 leading to the bellows in each of the bombs, compression-type tubing T's 30 and symbol 31 with valve stem 32, and flare type adapters 33. Only one pressure gauge 8 is needed for one entire bomb assembly. The desired pressure on the cakes is obtained by introducing fluid into the fluid system 27 through the valve stem 32. If air is used, an ordinary tire pump is sufficient for introducing the fluid.

In connection with the above described apparatus, it was found in most cases that during about the first day of the cake-forming operation the ammonium nitrate would settle, thereby causing a decrease in volume and a corresponding drop in pressure. In order to maintain a reasonably constant pressure, this made it necessary for the operator to check the bombs periodically and compensate for the pressure drop by tightening the jack screws 10 or adding fluid through the valve stem 32.

Figure 5:
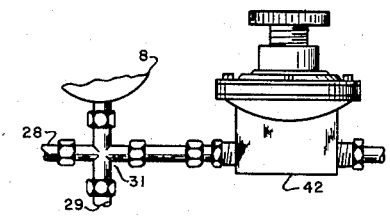
Figure 5 is a side elevation showing the modification of the embodiment illustrated in Figure 4, a fluid system being provided both for applying pressure and maintaining the pressure constant.

According to this invention a means of applying a substantially uniform pressure automatically is shown in Fig. 5. In this embodiment the main fluid supply line 28 is attached to a fluid supply source (not shown), e.g. air, throughout the cake-forming operation. The constant pressure valve 42 maintains the pressure constant.

This application is a division of application Serial No. 240,942, filed August 8, 1951, now U.S. Patent 2,762,294.

What is claimed is:

Apparatus for simultaneously preparing a plurality of test samples of granular material of the type which tends to coalesce in storage comprising a rigid frame, said frame having a top member, a spaced bottom member and connecting side members, a series of pressure responsive metallic bellows depending from said top member, pressure indicating means communicating with said bellows, a series of cylinder assemblies supported upon said bottom member in alignment each with one of said depending bellows, said cylinder assemblies each being comprised of an upstanding outer cylinder open at both ends, a bottom closure detachably secured in the lower end of said outer cylinder, an unattached bottom disk of less diameter than said outer cylinder resting upon said bottom closure, a divided cylinder insert resting upon said bottom disk and protruding above the free end of said outer cylinder, a top pressure disk of less diameter than said insert having sliding contact with the inner walls thereof, means for applying pressure to the samples of granular material disposed between said top pressure disks and said bottom disks of said cylinder assemblies, said top disk having contact with the free ends of said bellows upon the application of pressure to said samples, and a constant pressure valve for compensating for the drop in pressure on said samples due to the gradual coalescence thereof during prolonged exposure to temperature and humidity conditions likely to be encountered in storage.

References Cited in the file of this patent

UNITED STATES PATENTS

| | | |
|---|---|---|
| 877,139 | Tatarinoff | Jan. 21, 1906 |
| 2,325,027 | Anway | July 27, 1943 |
| 2,347,793 | Petersen | May 2, 1944 |
| 2,471,227 | Marshall | May 24, 1949 |